Sept. 3, 1968 N. SHEPTAK 3,399,424
APPARATUS FOR BLOW MOLDING PLASTIC BOTTLE WITH A HANDLE
Filed June 18, 1965 3 Sheets-Sheet 1

INVENTORS.
Nicholas Sheptak
Carl E. Beyer
ATTORNEYS

INVENTORS.
Nicholas Sheptak
Carl E. Beyer
BY
ATTORNEYS

Sept. 3, 1968  N. SHEPTAK  3,399,424
APPARATUS FOR BLOW MOLDING PLASTIC BOTTLE WITH A HANDLE
Filed June 18, 1965  3 Sheets-Sheet 3

INVENTORS.
Nicholas Sheptak
Carl E. Beyer
BY
ATTORNEYS

United States Patent Office 3,399,424
Patented Sept. 3, 1968

3,399,424
APPARATUS FOR BLOW MOLDING PLASTIC BOTTLE WITH A HANDLE
Nicholas Sheptak and Carlton E. Beyer, Midland, Mich., assignors to The Dow Chemical Company, Midland, Mich., a corporation of Delaware
Filed June 18, 1965, Ser. No. 465,082
7 Claims. (Cl. 18—5)

ABSTRACT OF THE DISCLOSURE

Blow molding apparatus for extruding a relatively narrow parison between die mold halves, pinching it at the bottom to form the desired narrow bottom pinch width, increasing the parison diameter by using a blow pressure until the parison body reaches the properly enlarged size for engagement of a handle section of the die mold halves, closing the mold halves and then blowing the parison in a conventional manner.

---

This invention relates to apparatus for the manufacture of hollow blow molded articles from thermoplastic materials and, more particularly, to the forming of a bottle having a relatively wide body but a narrow bottom pinch width.

In forming hollow articles such as bottles having a handle, it is necessary for an extruded parison to have a width sufficient to extend into the handle area of the mold halves prior to closure of the mold halves in order to catch the handle for blow molding. One common way in the past for achieving the proper width of a parison was to make a tubular extrusion of a width sufficient to be caught by the handle area. However, in achieving this wide parison by direct downward extrusion, closure of the free end of the parison resulted in a relatively wide pinch width, which pinch width would be at the bottom of the formed bottle if it were formed right-side-up. By forming "right-side-up" it is meant that a freely extruded parison extends in between mating die mold halves wherein the neck mold of the die cavity is at the top of the mold, there being jaws adjacent the bottom of the die cavity closable on the lower free end of the parison, this end being formed into the bottom of the container.

In having a wide pinch width, that is, a pinch width which extends substantially across the bottom of the container, the ends of the pinch often will be located in the heel or base corner of the container. It has been found that in this situation the stress crack resistance of the container at its base corner is greatly reduced. In other words, the stress concentrations at the ends of the pinch are so great in this instance that rupture of the container is likely to occur at the heel of the container.

Accordingly, it would be most desirable to extrude a parison having a wide body to catch the handle but having a narrow bottom pinch width. It is thus the basic objective of this invention to achieve such a controlled parison with the result that a relatively wide bottle-like container is formed having a very narrow pinch width, which container is highly resistant to stress cracking at its base.

Briefly, the present invention comprises extruding a relatively narrow parison between die mold halves, pinching it at the bottom to form the desired narrow bottom pinch width, increasing the parison diameter by using a blow pressure until the parison body reaches the properly enlarged size for engagement of a handle section of the die mold halves, closing the mold halves and then blowing the parison in a conventional manner.

Yet additional objects and advantages of the present invention, and its numerous cognate benefits and features are even more apparent and manifest in and by the ensuing description taken in conjunction with the accompanying drawing in which, wheresoever possible, like characters of reference designate corresponding material and parts throughout the several views thereof, in which.

Figure 1:
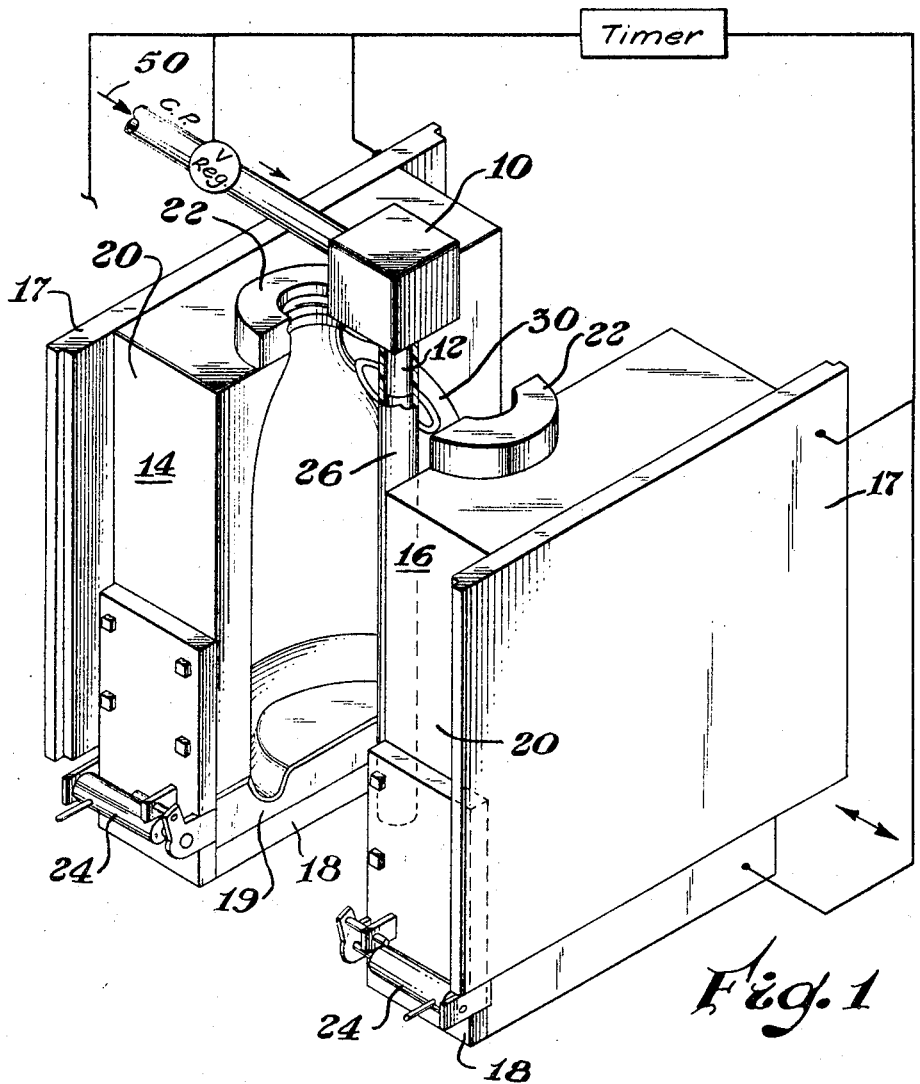
FIGURE 1 is an isometric view of open mold halves designed to form a handled bottle, a freely extruded parison extending therebetween.
Figure 6:
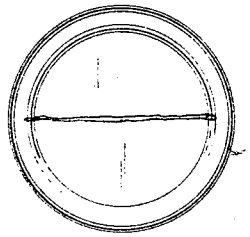
FIGURE 6 is a bottom view of a container showing a wide pinch width.
Figure 7:
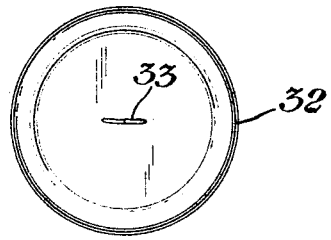
FIGURE 7 is a bottom view of a container showing the narrow pinch width of the present invention.

The blow molding apparatus of the present invention as illustrated comprises an extruder head 10 and extending therefrom, a blow pin 12. The extruder head 10 and blow pin 12 are directly over die mold halves 14 and 16 which can be hydraulically operated to open and close by conventional techniques that are not shown here in any detail other than by platen components 17 and a timer (programmed timing means). Each mold half 14 and 16 includes a matching base section 18, a matching main body section 20 and a matching neck section 22, which sections all together form the cavity, in this instance, for a handled bottle for containing bleach or other liquids, the main body section 20 including the handle area while section 18 includes the base of the container. By means of a hydraulic mechanism 24, or other equivalent actuating mechanism, each base section 18 is movable relative to body section 20 and in a parallel direction therewith to permit faces or jaws 19 of sections 18 to close on one another and achieve the disired end, which desired end will be more apparent from the operation description hereinafter set forth.

In the operation of this invention, as seen in sequence in FIGURES 1 to 4, a straight relatively narrow parison 26, preferably not much larger in diameter than the opening neck die sections 22, is extruded between the die mold halves 14 and 16 downwardly substantially centrally between the mold halves 14 and 16. This parison has an open bottom which must be sealed before a blowing air or other gaseous medium can be introduced thereinto.

Figure 2:
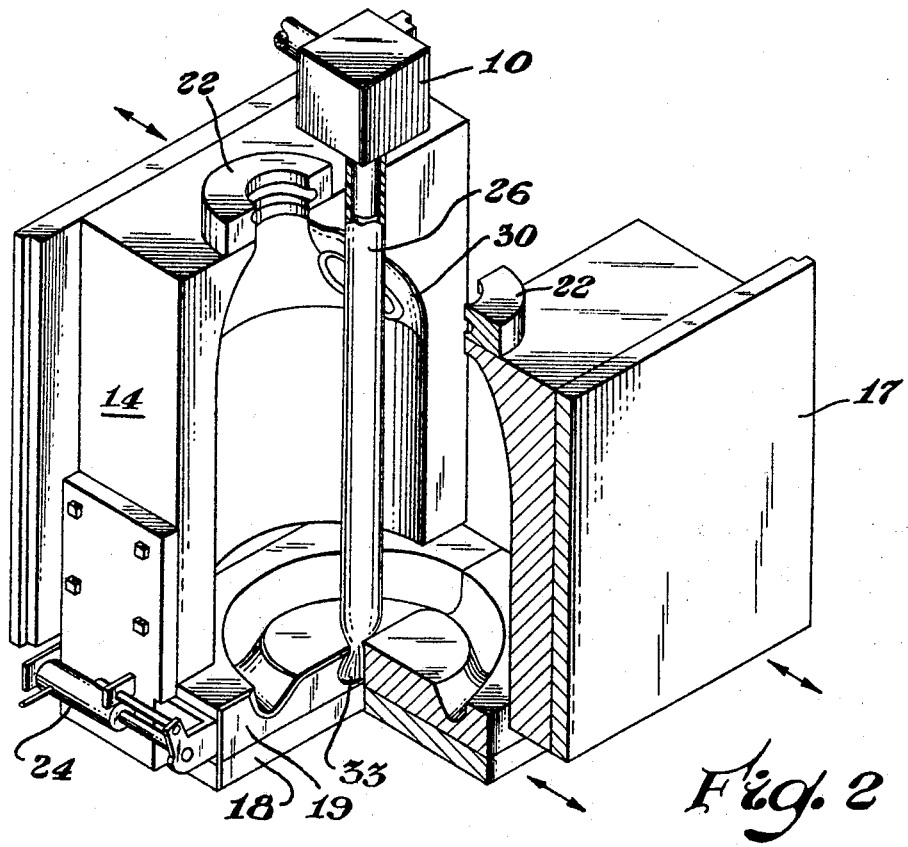
FIGURE 2 is a view like FIGURE 1 only with the bottom of the extruded parison being pinched closed.

To achieve the results described by this invention, the relatively narrow open bottom end of the parison is pinched closed by jaws 19 to form a sealed end 28, as illustrated in FIG. 2, when the bottom sections 18 come together, the moin body sections 20 remaining open. With the bottom of the parison pinched closed it is obvious that blowing air can now be introduced through blow pin 12 into the parison to achieve a ballooning effect.

Figure 3:
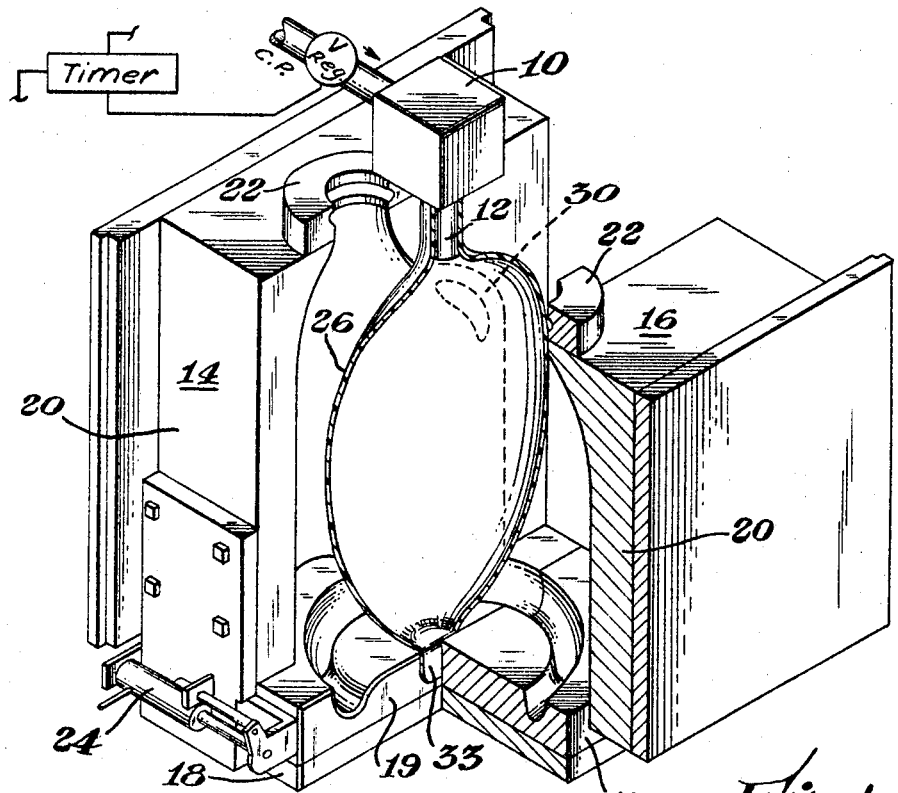
FIGURE 3 is a view like FIGURE 2 only with the parison body being pre-blown to a proper diameter.
Figure 4:
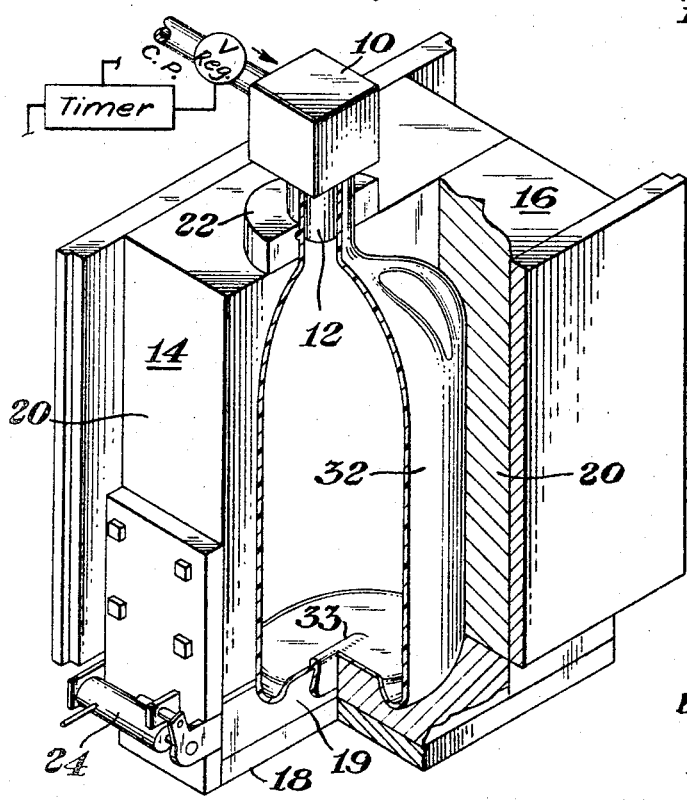
FIGURE 4 is an isometric view of the mold halves of FIGURES 1 to 3 in a closed position, with the parison being blown to the full size of the mold cavity.

This ballooning effect is illustrated in FIG. 3. The original parison diameter is ballooned or extended to a diameter such that it overlaps the handle area 30 of the body section 20 of the mold halves 14. Thus, when the mold halves 14 and 16 subsequently close, as illustrated in FIG. 4, the handle area 30 of the die mold halves 14 and 16 catch the parison 26 to form the handle of the bottle, which parison 26 is then fully blown by additional air through the blow pin 12. A handled bottle 32 having a narrow pinch width 33 is achieved in the mold. According to the usual practice, the bottle is then allowed to cool, usually aided by a cooling media traveling through the mold halves but not here shown, the mold halves 14 and 16 are opened, the bottle 32 then or the parison 26 previously being severed from the extruder head. Bottle 32 is then blown off of blow pin 12.

In achieving the pre-blow condition illustrated in FIG. 3 and the final blown condition illustrated in FIG. 4, as well as the blow off air for removing the blown bottle 32 from between the die mold halves, a single constant air pressure source is preferably used. For achieving the pre-blown condition the pressure is metered through a valve and blow pin 12 for that length of time which is necessary to achieve the ballooning effect desired. Upon obtaining the proper ballooning effect the molds close, the blowing air continues to be introduced (or is again introduced if previously shut off) into the parison for a length of time sufficient to complete the full blowing of the parison into the configuration of bottle 32. After the molds open, the extrusion being severed about the neck portion, the air pressure is again introduced for an instant to blow the container out from between the mold halves. A conventional valve timing mechanism, such as a timer or its equivalent, can be employed to achieve the necessary blow air periods to accomplish the above stated desired results. The air pressure source should be sufficient to accomplish its functions speedily. A source pressure of from 50 to 100 pounds per square inch has been found to be satisfactory.

Figure 5:
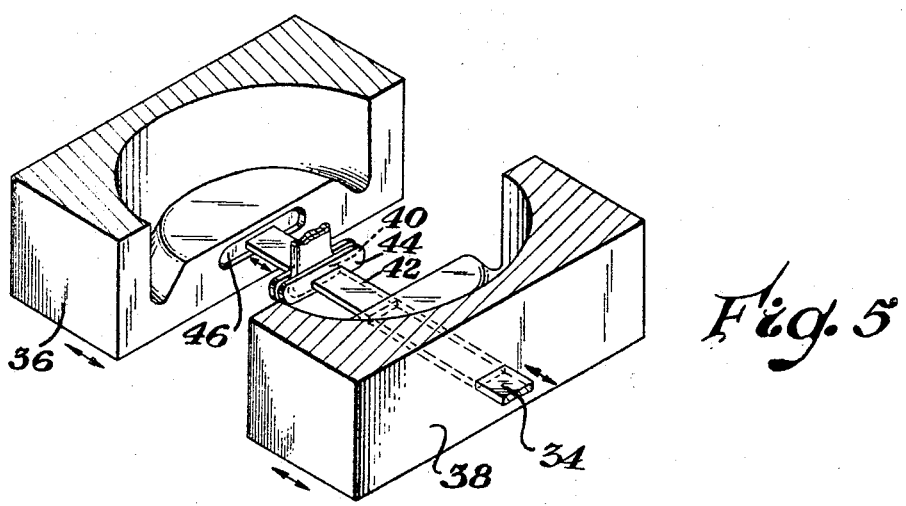
FIGURE 5 is a fragmentary isometric view of a modified arrangement for pre-pinching a parison by the use of auxiliary slidable bars.

Another embodiment of this invention is shown in FIG. 5 wherein the mold halves 36 and 38 are each an integral unit. The pre-pinch shown in this view is achieved by a bar 34, in this instance being T-shaped, which is hydraulically actuated from and slidable within the bottom of each mold half 36 and 38 to mate and catch the free open end of the parison thus forming a narrow pinch 40. T-shaped bar 34 comprises a stem 42 having a transverse head or face 44 fittable flush within the front face of its respective mold half by resting in a seat 46. When actuated, bars 34 move out substantially perpendicularly from each mold half 36 and 38, bars 34 meeting about half way therebetween. After narrow pinch 40 is formed, the parison is pre-blown in a manner similar to that shown in FIG. 3 and then fully blown as illustrated in FIG. 4. The sliding bar technique can provide for exceptionally even closing of the parison wall.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. Blow molding apparatus comprising opposite blow mold halves, each said half comprising a body section including a cavity defining a portion of a handled bottle, means slidable with respect to said section and adapted to mate with another slidable means generally centrally laterally of said mold halves, each said slidable means having a mating face of a width at least as great as that of a parison to be extruded therebetween, the upper end of said body sections including an opening defining a neck ring portion, means for extruding said parison downwardly between said mold halves, said means including a blowing means, a pressurized source of gaseous media for introduction through said blowing means into said parison, and means for limiting the amount of gaseous media introduced into said parison at a given time to expand the parison such that portions of it are located between the handle areas of said body sections prior to mold closing and to complete blowing after mold closing, and including means for the sequential opening and closing of said body sections and slidable means.

2. The blow molding apparatus of claim 1 wherein said slidable means comprises a separate bottom section forming part of each mold half, each said bottom section being movable with respect to the main body section.

3. The blow molding apparatus of claim 1 wherein said blowing means comprises a hollow pin extending into said parison.

4. The blow molding apparatus of claim 1 wherein said means for limiting the amount of gaseous media into said parison at a given time comprises a programmed timer.

5. The blow molding apparatus of claim 4 wherein said programmed timer comprises a valve and a timing mechanism operating off of a pressure source, said source having a constant pressure.

6. The blow molding apparatus of claim 1 wherein each said slidable means comprises a bar slidable inwardly and outwardly from the bottom part of each body section.

7. The blow molding apparatus of claim 6 wherein said bar is T-shaped and horizontally disposed such that the head of the T forms the head of said bar.

References Cited

UNITED STATES PATENTS

| 3,048,891 | 8/1962 | Mass. | |
| 3,120,679 | 2/1964 | Price et al. | 18—5 |
| 3,159,697 | 12/1964 | Pocci | 18—5 |
| 3,300,556 | 1/1967 | Battinfeld | 18—5 |

FOREIGN PATENTS

| 688,997 | 3/1953 | Great Britain. |

WILBUR L. McBAY, *Primary Examiner.*